(12) United States Patent
Liu

(10) Patent No.: US 11,585,514 B2
(45) Date of Patent: Feb. 21, 2023

(54) RING FLASH LIGHT DIFFUSION DEVICE

(71) Applicant: Jess Li-Je Liu, Boston, MA (US)

(72) Inventor: Jess Li-Je Liu, Boston, MA (US)

( * ) Notice: Subject to any disclaimer, the term of this patent is extended or adjusted under 35 U.S.C. 154(b) by 0 days.

(21) Appl. No.: 17/229,435

(22) Filed: Apr. 13, 2021

(65) Prior Publication Data
US 2022/0325868 A1 Oct. 13, 2022

(51) Int. Cl.
*F21V 3/06* (2018.01)
*F21V 5/04* (2006.01)
*F21V 33/00* (2006.01)
*H04N 5/225* (2006.01)
*F21Y 105/18* (2016.01)

(52) U.S. Cl.
CPC .......... *F21V 5/046* (2013.01); *F21V 33/0052* (2013.01); *H04N 5/2254* (2013.01); *F21Y 2105/18* (2016.08); *G03B 2215/0539* (2013.01); *G03B 2215/0575* (2013.01); *G03B 2215/0589* (2013.01); *G03B 2215/0592* (2013.01); *H04N 5/2256* (2013.01)

(58) Field of Classification Search
CPC ........ F21V 3/049; F21V 3/0625; F21V 5/046; G03B 2215/0539; G03B 2215/0575; G03B 2215/0589; G03B 2215/0592
See application file for complete search history.

(56) References Cited

U.S. PATENT DOCUMENTS 7,424,216 B2 9/2008 Liem
7,712,907 B2 5/2010 Zyka
2006/0039692 A1 2/2006 Lee et al.
2010/0315816 A1 12/2010 Madelin
2015/0227026 A1 8/2015 Miyakawa et al.
2016/0265730 A1* 9/2016 Schileo ..................... F21L 4/02

FOREIGN PATENT DOCUMENTS

EP 2350707 B1 9/2018
NZ 563064 A 4/2010

OTHER PUBLICATIONS

Alpacalypse. "Point-and-Shoot Ring Flash Diffuser". 10 pages.
Supon W48 200LM LED Macro Ring Flash Lighting with Ring Diffuser. 5 pages.
Olympus. Flash Diffuser (FD-1) for TG-1/2/3/4/5/6. 6 pages.
Canon MR-14EX II Macro Ring Lite Diffuser—by Trick Bits Custom Moulding. 5 pages.
18" Ring Light 4-Color Soft Cover Diffuser. 2 pages.
Buff, Paul C., AlienBees™ Ringflash Front Cover / Diffuser. 1 page.

* cited by examiner

*Primary Examiner* — Sean P Gramling
(74) *Attorney, Agent, or Firm* — Lowenstein Sandler LLP; Karen Tonoyan

(57) ABSTRACT

A ring flash light diffusion device includes a first converter ring configured to connect to a camera lens and a diffuser adapter. The diffuser adapter can be connected to a first end of the first converter ring. It also includes a flash ring connected to the diffuser adapter at a position along the length of the diffuser adapter and a ring flash connected to the flash ring. It further includes a light diffuser connected to the diffuser adapter such that light emitted from the ring flash passes through the light diffuser.

15 Claims, 11 Drawing Sheets

RING FLASH LIGHT DIFFUSION DEVICE

FIELD OF INVENTION

Embodiments of the present invention are directed to a photographic light diffusion device and system. More specifically, embodiments of the present invention pertain to photographic ring flash light diffusion.

BACKGROUND

In various circumstances, photographers are often plagued with inadequate or inappropriate light environments necessary to capture the subject of the photograph in an image of a desired visual quality. In particular, the lighting angle, focus, and direction all serve to impact the way a given subject will appear on a photograph.

Non-concentrated more diffuse lighting is often desirable help to obtain softer images with smoother edges. Diffuse lighting can be created by having a large light source far away from the subject and photographic camera or by having the light beams hit the subject from various angles. This effect can be achieved by passing a light through partially transparent or translucent materials such as diffusion gels, frosted glass screens, umbrellas, or cloth as well as by passing the light through a device with many reflective surfaces before it arrives at the subject being photographed. Such approaches are useful in a controlled indoor environment that is sufficiently large but are unwieldy and inconvenient to carry and relocate.

For circumstances where a photographer needs to have freedom of movement or positioned close to the subject being photographed, the approaches and devices described in the previous paragraph are inadequate. This inadequacy is particularly noticeable when it is desirable to capture an image of an object in motion or if the object is positioned very close to the camera as is the case for macro photography. Positioning a light source such as a ring flash on the end of a camera lens facilitates portability but provides a sharp bright light that creates dark deep undesirable shadows with high contrast in many circumstances.

Accordingly, there is a need for a light diffusion device that is easily portable and attachable to a camera. There likewise is a need in the field for a diffusion device that could accommodate a variety of light sources positioned on the camera lens such as variety of ring flash light sources to allow light to be diffused closer to the object being photographed.

SUMMARY

Embodiments of the present invention are directed to an adjustable portable ring flash light diffusion device that can be attached to the end of a camera lens to provide a source of diffuse light for photographing a subject. Embodiments of the present invention are configured to be compatible with a variety of different ring flash types and lens sizes for convenient installation, use, and adjustment.

In accordance with one embodiment of the present invention, a ring flash light diffusion device a first converter ring configured to connect to a camera lens and a diffuser adapter connected to a first end of the first converter ring. It also includes a flash ring connected to the diffuser adapter at a position along the length of the diffuser adapter and a ring flash connected to the flash ring. It further includes a light diffuser connected to the diffuser adapter such that light emitted from the ring flash passes through the light diffuser.

In accordance with another embodiment of the present invention, a ring flash light diffusion device includes a first converter ring, a diffuser adapter, a flash ring, a second converter ring, a ring flash, and a light diffuser. The first converter ring is configured to be secured to a camera lens at a first end and to the diffuser adapter at the other end. The diffuser adapter extends partially through the flash ring, which is attached to the diffuser adapter between the diffuser adapters proximal end and distal end, and is circumferentially connected to the ring flash. The diffuser adapter is further attached to a second converter ring at the diffuser adapters distal end to connect a distal end of the second converter ring to the light diffuser with the light diffuser is positioned distally in front of the ring flash such that light emitted by the ring flash passes through the body of the light diffuser.

In accordance with one embodiment of the present invention, a ring flash light diffusion device includes a flash ring configured to attach to a camera lens and a ring flash attached to the flash ring. It further includes a light diffuser attached to the flash ring such that light emitted by the ring flash passes through the light diffuser.

In accordance with another embodiment of the present invention, a ring flash light diffusion device includes a flash ring configured to connect to a camera lens at a proximate end of the flash ring. The flash ring is circumferentially attached to a ring flash at a location between the proximate and distal ends of the flash ring and is attached to a light diffuser at the distal end of the flash ring. The light diffuser is positioned distally in front of the ring flash such that light emitted by the ring flash passes through the diffusing material of the light diffuser.

In accordance with one embodiment of the present invention, a ring flash light diffusion device has a body that is formed with a semitransparent material. The body includes a first circular wall and a second circular wall that is concentric with the first circular wall and surround the first circular wall. The body also has a ring of the semitransparent material connecting the first circular wall and the second circular wall, where the second circular wall defines an opening extending through the body. The body further includes an attachment means at an end of the first circular wall that is opposite the ring.

In accordance with yet another embodiment of the present invention, a ring flash light diffusion device includes a light diffuser configured to removably connect to a camera lens and cover a light emitting area of a ring flash. The light diffuser has a body made of semitransparent material and has an outer circular wall concentric with an inner circular wall. The inner and outer wall are connected to each other at their respective distal ends by a ring of the semitransparent material such that light emitted from the light emitting area of the ring flash passes through the semitransparent material of the light diffuser.

These and other features, aspects, and advantages of the embodiments of the present invention will become better understood and apparent by reference to the following detailed description of the illustrative embodiments, which is to be read in connection with the accompanying drawings and the appended claims.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

The disclosure will provide details in the following description of preferred embodiments with reference to the following figures wherein.

DETAILED DESCRIPTION OF THE PREFERRED EMBODIMENTS

Figure 1:
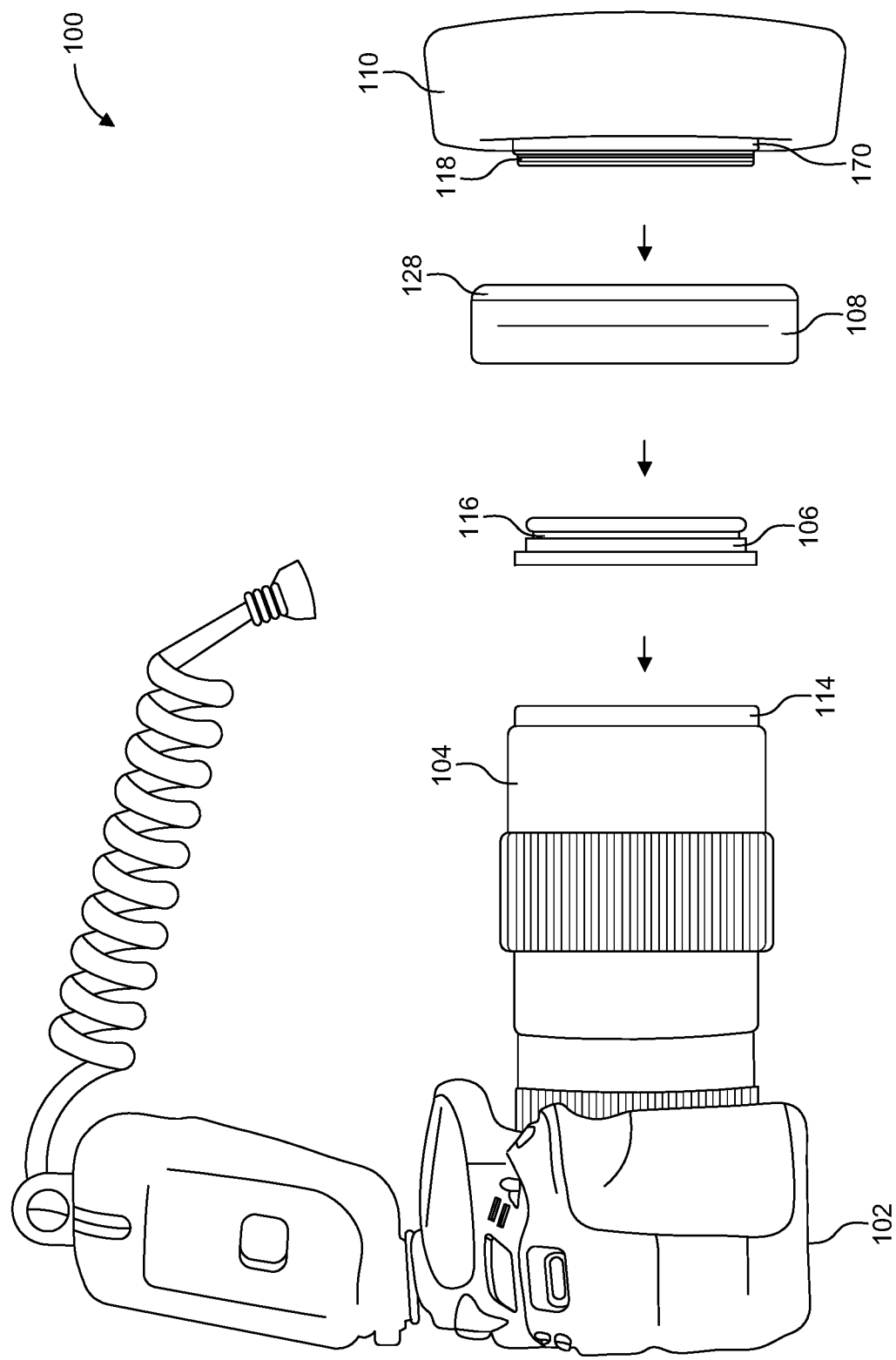
FIG. 1 is a side exploded view of an assembly of a ring flash light diffusion device, in accordance with an embodiment of the present invention.

In the Summary above and in this Detailed Description, and the claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

Reference in this specification to "one embodiment" or "an embodiment" of the present invention, as well as other variations thereof, means that a particular feature, structure, characteristic, and so forth described in connection with the embodiment is included in at least one embodiment of the invention. Thus, the appearances of the phrase "in one embodiment" or "in an embodiment", as well any other variations, appearing in various places throughout the specification are not necessarily all referring to the same embodiment.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present description, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present description does not explicitly recite each and every permutation that may be obtained by choosing from the set of optional features. However, the present description is to be interpreted as explicitly disclosing all such permutations. For example, a device described as having three optional features may be embodied in seven different ways, namely with just one of the three possible features, with any two of the three possible features or with all three of the three possible features.

In the present description, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

It will also be understood that when an element is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected", "mounted", or "coupled" to another element, it can be directly connected, mounted, or coupled to the other element or intervening elements can be present. In contrast, when an element is referred to as being "directly connected", "directly mounted", or "directly coupled" to another element, there are no intervening elements present. It should be understood that the terms "mounted", "connected", and "coupled" are used interchangeably herein.

As used herein, a "proximal" part or end of an element is defined as the part or end of the element that is closer to the point of the diffusion device's connection with a camera lens and a "distal" part or end of an element is defined as the part or end of the element that is farther away from the point of the diffusion device's connection with a camera lens. Further, a "proximal direction" is defined as a direction from the diffuser toward the point of the diffusion device's connection with a camera lens and a "distal direction" is defined as a direction away from the point of the diffusion device's connection with a camera lens or the direction in which a light beam normal to the circumference of the ring flash would travel away from the ring flash when the ring flash is producing light. As used herein, the phrase "circumferentially connected" when used in reference to one or more objects should be understood to mean that the one or more objects are connected along a circumference of at least one of the objects.

Throughout this description like features and elements are referred to with like reference numerals in different embodiments described herein. Embodiments of the invention relate to a photographic light diffusion device and system. More specifically, embodiments of the present invention pertain to a device for convenient ring flash light diffusion. While generally reference will be made to a diffusion device in the context of photography, it should be appreciated that the embodiments described herein are applicable to photographic cameras, video cameras, and similar devices without departing from the spirit and scope of the invention. Embodiments described herein provide a novel light diffusion device configured to produce softer clearer images by passing light through a generally circular light diffuser of semitransparent material connected to a camera lens. The diffuser is connected to a camera lens by means of a plurality of ring-like converters and adapters that allow for the mounting of the device on a variety of cameras and lenses and permit interoperability with a variety of ring flash devices.

The several embodiments described herein provide a convenient device which can be mounted on either the threads of a camera lens or on a ring flash device to direct diffuse light at an object being photographed. The embodiments of the invention can be used with and may incorporate a variety of ring flash devices directly and through the use of an adapter that can be screwed onto a camera lens to provide mounting threads for a ring flash device and light diffuser in situations when mounting threads are not present on the ring flash device. It should be understood that the various embodiments described herein are compact, portable, and are easy to attach to and detach from a camera.

Embodiments of the present invention remove the need of carrying around and using cumbersome, bulky lighting equipment and allow for truly spontaneous photography. One embodiment of the light diffusion device is an accessory that modifies light coming out of a ring flash that is screwed onto a distal portion of a ring flash creating a more diffuse and softer lighting effect in a resulting image.

Figure 2A:
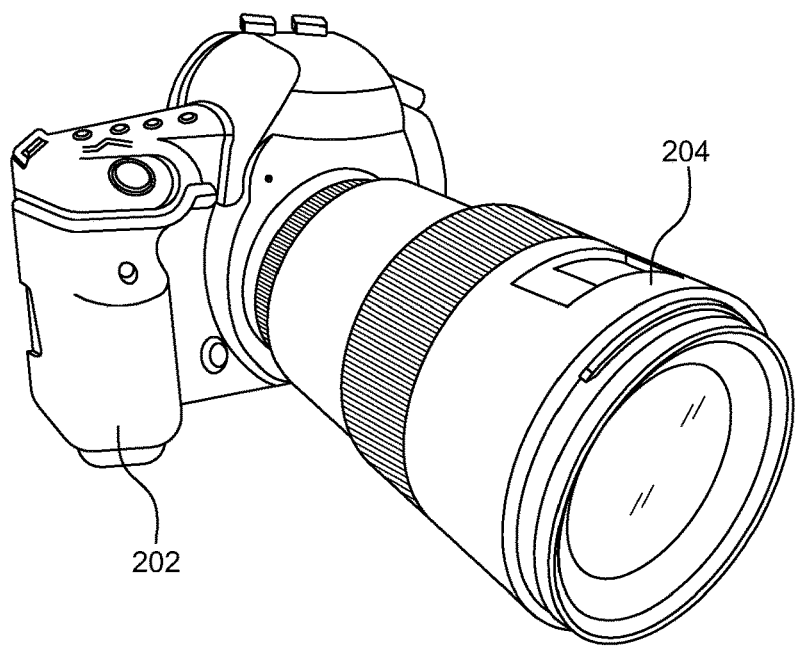
FIG. 2A is a perspective view of a camera with a mounted lens, in accordance with an embodiment of the present invention.

Turning now to FIG. 1, a side exploded view of an assembly of a ring flash light diffusion device 100 depicting a camera 102, lens 104, flash ring 106, ring flash 108, and a light diffuser 110. In many cases, as can be seen in FIG. 2A if the lens 104 does not have a matching set of attachment means 114 to connect the ring flash 108 to the exterior of the lens 104, a flash ring can be used to permit attachment of other components onto the lens of the camera. In one embodiment, one end of a flash ring is screwed onto threads of attachment means 114 present on a circular exterior surface of the camera lens 104. A ring flash 108 is connected to the flash ring 106 circumferentially along an exterior surface of the flash ring 106. To connect the flash ring 106 to the ring flash 108, some embodiments include a flash ring 108 that has a circumferential groove 116 on an exterior surface that is configured to secure the ring flash 108 to the flash ring 108. In other embodiments. the ring flash 108 is connected to the flash ring 106 by attachment means located along an inner circumference of the ring flash 108 that interlock with corresponding attachment means located along an outer circumference of the flash ring 106.

Figure 2B:
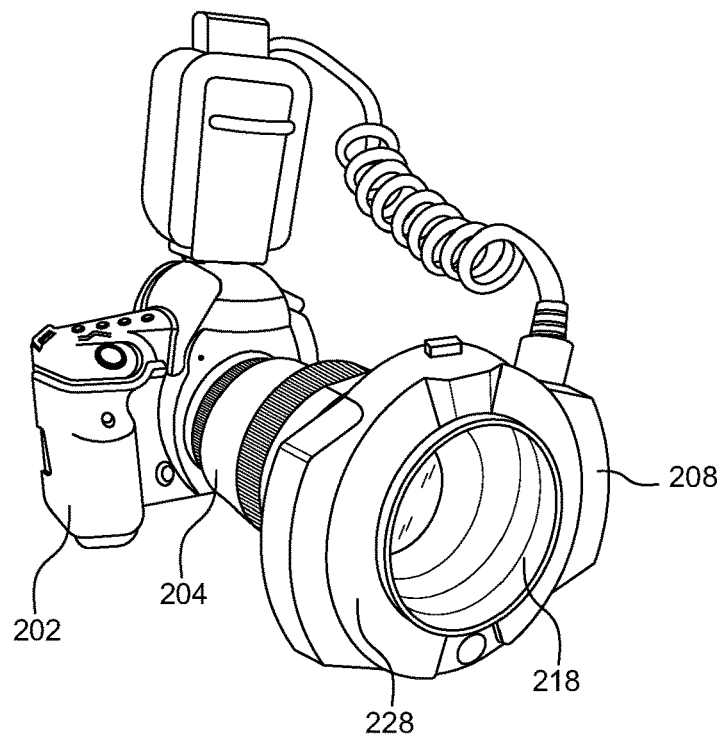
FIG. 2B is a perspective view of a camera with a mounted lens and ring flash, in accordance with an embodiment of the present invention.
Figure 2C:
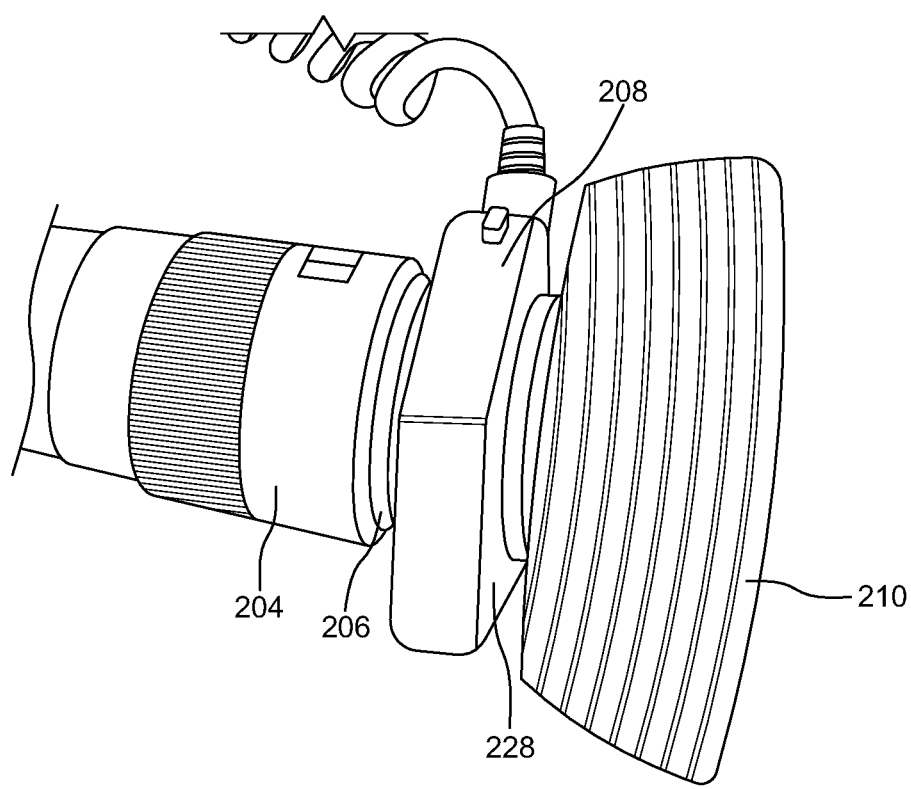
FIG. 2C is a perspective view of a camera with a mounted lens, ring flash, and light diffuser, in accordance with an embodiment of the present invention.
Figure 2D:
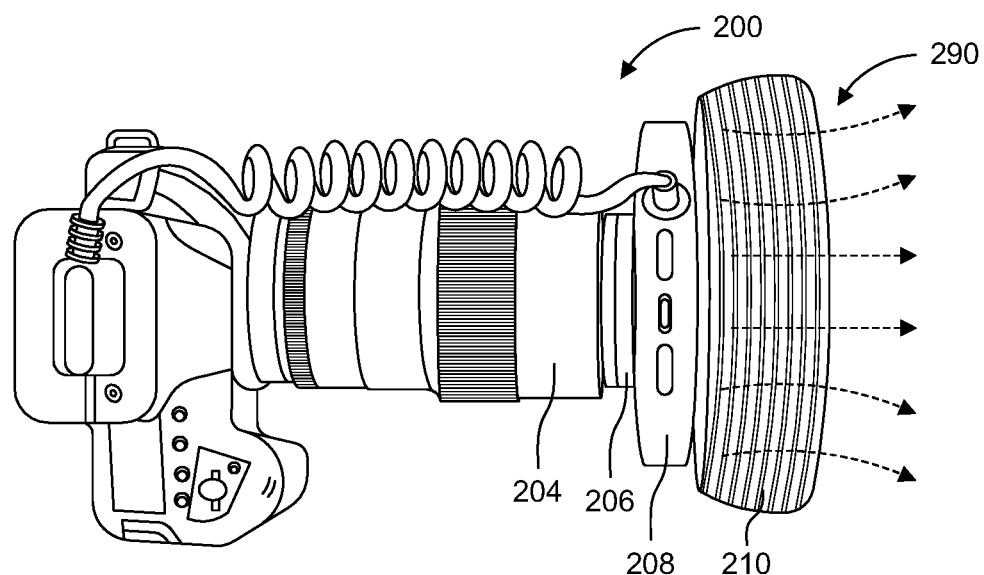
FIG. 2D is a top view of a camera with a mounted lens, ring flash, and light diffuser, in accordance with an embodiment of the present invention.
Figure 3A:
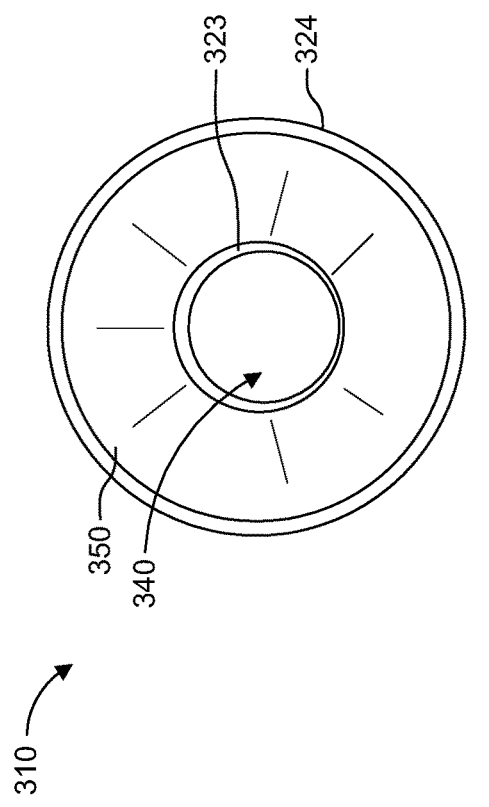
FIG. 3A is a rear view of a light diffuser, in accordance with an embodiment of the present invention.
Figure 3B:
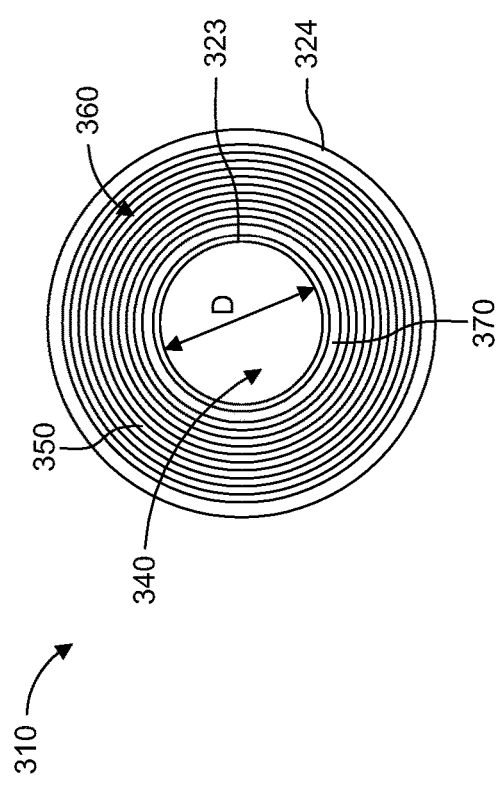
FIG. 3B is a front view of a light diffuser, in accordance with an embodiment of the present invention.
Figure 3C:
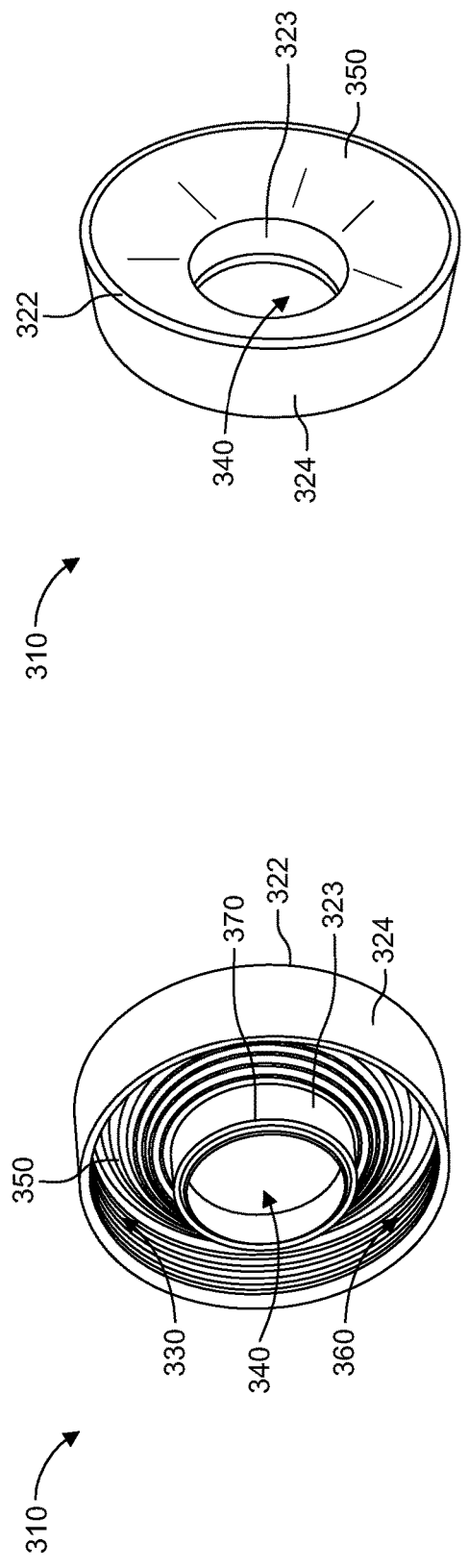
FIG. 3C is a rear perspective view of a light diffuser, in accordance with an embodiment of the present invention.
Figure 3D:
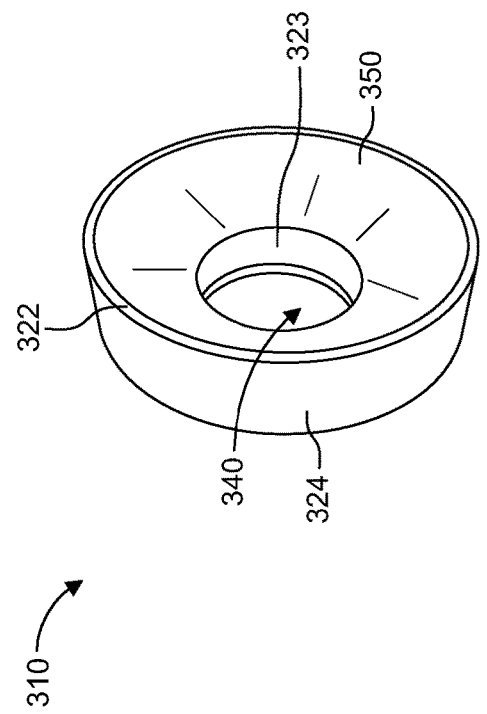
FIG. 3D is a front perspective view of a light diffuser, in accordance with an embodiment of the present invention.

Referring now to FIGS. 2A-2D, an assembly of a ring flash light diffusion device 200 depicting a camera 202, lens 204, flash ring 206, ring flash 208, and a light diffuser 210 are shown. Accordingly, as shown in FIG. 2B, the distal end of the flash ring 206 is positioned inside an opening of the attached ring flash 208 and screw threads 218 present on an inner circumferential surface of the distal end of the ring flash 208 remains accessible for further attachment to the light diffuser 210. In preferred embodiments, as seen in FIGS. 2B-2C, the light diffuser 210 has a screwing attachment means, located at a circular protruding portion thereof, that engage corresponding attachment means 218 along an inner circumference of the ring flash. In such embodiments, the light diffuser 210 is screwed onto threads 218 present on the distal end of the ring flash 208. The light diffuser 210 has a circular protruding portion defining an opening in the body of the light diffuser 210. Screwing attachment means, such as complementary threads that can be screwed into the threads 218 located on the distal side of the ring flash 218, are located on a proximal end of the protruding portion. With reference to FIGS. 2C-2D, it should be understood that when the light diffuser 210 is screwed on to the ring flash 208, the protruding portion of the light diffuser can extend into an interior opening of the ring flash 208 while the body of the light diffuser covers the light emitting area 228 of the ring flash. In the preferred embodiment, when the light diffuser 210 is attached to the ring flash 208, light 290 that is emitted from the ring flash 208 passes into a cavity formed by the body of the light diffuser 210 and is diffused by passing through the body of the light diffuser.

Turning now to FIGS. 3A-3D, several views of a light diffuser 310 are depicted in accordance with an embodiment of the present invention. The light diffuser 310 is shaped to create a cavity 330 that would cover a light emitting area of a ring flash and permit light to pass through the body of the light diffuser. The light diffuser 310 need not envelop the ring flash or the light emitting portion of the ring flash in some embodiments, and it may cover the light emitting portion partially, permitting some of the emitted light to avoid passing through the body of the light diffuser 310. It should be understood that a variety of materials may be suitable to form the body of the light diffuser 310. In one embodiment, the body 322 of the light diffuser 310 is made of a semitransparent material that diffuses light when light passes through it. The light diffuser 310 can be formed from materials such as plastics and polymers using a variety of suitable molding and non-molding processes including vacuum molding. One skilled in the art would understand that there are a variety of suitable materials for forming the light diffuser that can provide desired light diffusion characteristics and have structural properties that would permit it to hold its shape so that the light diffuser 310 can be mounted onto a camera lens and ring flash assembly.

In a preferred embodiment, the light diffuser 310 has two concentric walls. An inner wall 323 defines an opening 340 going through the light diffuser that permits light from an object that is being photographed to pass into the lens of the camera. An outer wall 324 defines an exterior surface of the body 322 of the light diffuser 310 and is connected to the inner wall by a ring 350 of the semitransparent material. In a preferred embodiment, the ring 350 of semitransparent material may be circular and substantially flat. In some embodiments the proximal (i.e., inner) surface of the body of the light diffuser may be textured (e.g., with ridges, bumps, grooves, zig-zags, etc.) 360 to alter the diffusion characteristics of the light diffuser. Alternative embodiments may have both proximal and distal (i.e., outer) surfaces of the light diffuser 310 be either textured or substantially smooth. In some embodiments, the body of the light diffuser 310 may be made of more than one material. In other embodiments, either or both of the inner wall 323 and protruding portion 370 may be made of a different material that is preferably more rigid than the remainder of the body 322 of the light diffuser 310. The thickness of the inner wall 323, outer wall 324, and ring 350 can vary from a few millimeters to several centimeters, in accordance with the embodiments of the present invention, depending on the material from which the light diffuser 310 is made and the light diffusion characteristics that are desired.

In some embodiments, the inner wall 323 and the protruding portion 370 may have a variety of sizes and diameters including diameters of 50 mm-80 mm. In a preferred embodiment, the diameter D of the attachment means of the protruding portion is 67 mm. In one embodiment the outer wall 324 of the body 322 of the light diffuser 310 is tapered going from its distal end to its proximal end. In some embodiments the outer wall 324 is parallel to the inner wall 323 while in other embodiments the outer 324 wall is angled relative to the inner wall 323. Similarly, in some embodiments, the distal surface of the ring 350 of the light diffuser body 322 may be perpendicular to or angled relative to the direction of light propagating from the ring flash (i.e., perpendicular to or angled relative to the axis of symmetry of the circular opening 340 of the light diffuser body 322).

In a preferred embodiment an inner surface or an outer surface of the body 322 of the diffuser 310 is textured. In some embodiments, the outer circular wall 324 is angled relative to the inner circular wall 323. In one embodiment the ring 350 is perpendicular relative to its axis of rotation while in another embodiment the ring 350 is angled relative to at least the outer wall 324 or the inner wall 323.

Referring again to FIG. 1, embodiments of the present invention incorporate a flash ring 106 that includes a circumferential groove 116 on an exterior surface configured to secure the ring flash 108 by depressable attachment means or by friction. The ring flash 108 can be connected to the flash ring 106 by attachment means located along an inner circumference of the ring flash 108 that interlock with corresponding attachment means (e.g., groove 116) located along an outer circumference of the flash ring 106. Furthermore, the light diffuser 108 may have a screwing attachment means 118, located at a circular protruding portion 170 thereof, that engage corresponding attachment means along an inner circumference of the ring flash 108. Additionally, in some embodiments, the light diffuser 108 at least partially covers a light emitting portion 128 of the ring flash 108 and can be screwed on to the flash ring 106. In a preferred embodiment of the present invention, the diameter of the flash ring 106 is different from a diameter of the ring flash 108 and the light diffuser 108 is formed with a semitransparent material.

Figure 4:
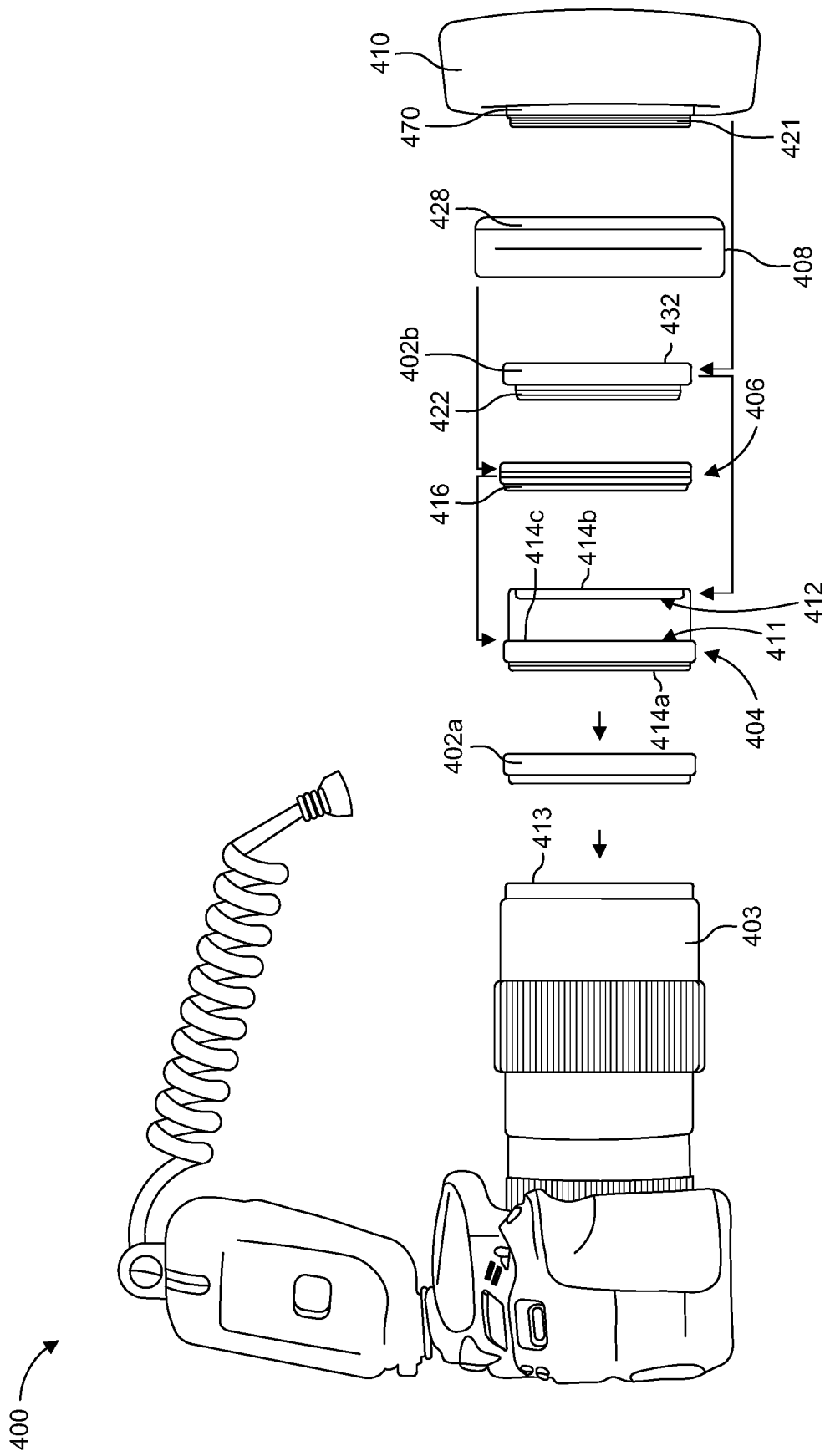
FIG. 4 is a side exploded view of an assembly of a ring flash light diffusion device, in accordance with an embodiment of the present invention.

An alternative embodiment of the present invention is depicted in FIG. 4 which shows a side exploded view of an assembly of a ring flash light diffusion device. A first converter ring 402a may be screwed onto the camera lens 403 by attachment means 413 such as complementary screw thread present on the end of the camera lens 403 and the proximal end of the first converter ring 402a. Each of the converter rings described herein may be a step-up or a step-down converter ring which has screwing threads on an outer (i.e., away from the rotational axis of symmetry of the ring) surface at a one end having a first diameter and screwing threads on an inner (i.e., toward the rotational axis of symmetry of the ring) surface at another end having a second diameter. By attaching a converter ring, the diameter of an aperture can be increased (stepped-up) or decreased (stepped-down) to permit screwing attachment of other components. The converter ring screwing thread and aperture diameters may have a variety of sizes including a range of 50 mm-80 mm. For the purposes of this description, it should be understood that a converter ring described as an "X-to-Y" converter ring has an attachment means with diameter X mm at one end and attachment means of diameter Y mm on an opposite end. Accordingly, a preferred embodiment of the present invention includes a 55-to-77 converter ring. Other embodiments include 58-to77, 62-to-77, and 67-to77 converter rings. One of skill in the art would understand that there are a variety of step-up (i.e., smaller-to-larger diameter) and step-down (i.e., larger-to-smaller diameter rings) that are suitable for use to connect the elements of the embodiments described herein.

In a preferred embodiment, a diffuser adapter 404 may be connected to a distal end of the converter ring 402a. The diffuser adapter 404 may be substantially cylindrical in shape and have different interior and exterior diameters along its length. In preferred embodiments, the diffuser adapter 404 is formed from a rigid material such as a metal, carbon fiber, ceramic, plastic, or rigid polymer material. The converter rings can likewise be made from metal, carbon fiber, ceramic, plastic, or rigid polymer materials. One of skill in the art would understand that there are a variety of suitable materials for forming the diffuser adapter and the converter rings. Similar to a converter ring 402a, 402b, the diffuser adapter 404 can have a screwing attachment means 414a with threads of one diameter at a proximal end and can have an attachment means 414b at the distal end having a different diameter. In a preferred embodiment, the diffuser adapter 404 may have screwing attachment means 414c positioned circumferentially at a position (e.g., position 411) along the length of the diffuser adapter 404 between its proximal and distal ends. Furthermore, the diffuser adapter may have a screwing attachment means 414b such as screw threads located on an interior surface at its distal end (e.g., position 412). In one embodiment, the diffuser adapter 404 has a 77 mm screwing attachment means 414a at a proximal end, 72 mm screwing attachment means 414c at position 411, and a 62 mm screwing attachment means 414b at position 412. It should be understood that while screwing attachment means are used to describe example embodiments herein, it is envisioned that clip-on, adhesive, magnetic, and matching groove-and-tongue attachment means can be used instead of screwing attachment means between the various components of the embodiments including, but not limited to, the connections between the converter ring, the diffuser adapter, the light ring, the ring light, and the light diffuser.

In a preferred embodiment, a flash ring 406 can connect to the diffuser adapter 404 at position 411 by means of corresponding screwing thread attachment means 416 at its proximal end. It should be understood that, in a preferred embodiment, the diameter of the opening of the flash ring 406 is larger than the outer diameter of a distal portion of the diffuser adapter 404 so that the distal portion of the diffuser adapter 404 extends through the flash ring 406 when the flash ring is attached to the diffuser adapter at position 411.

In some embodiments, another converter ring 402b with attachment means of different diameters at its distal and proximal ends can be connected to the diffuser adapter 404. In a preferred embodiment screwing attachment means 422 threads located on a proximal end of the converter ring 402b can be connected to the corresponding screwing attachment means 414 located at position 412 of the diffuser adapter 404.

In a preferred embodiment, a ring flash 408 is connected to the flash ring 406 circumferentially along an exterior surface of the flash ring 406 that is affixed at position 411 to the diffuser adapter 404. It should be understood that, in a preferred embodiment, the maximum diameter of the flash ring 406 and of the converter ring 402b may be smaller than the diameter of the circular opening of the ring flash 108 to permit the ring flash to go around and attach to the flash ring 406. In the preferred embodiment, the flash ring 406 has 72 mm screwing attachment means 416 that attach to corresponding attachment means 414c on the diffuser adapter 404 at position 411.

In a preferred embodiment, the light diffuser 410 is connected to the converter ring 402b. The light diffuser can be attached to the distal end of the converter ring by the attachment means 421 (e.g., screwing threads) located at the proximal end of the protruding portion of the light diffuser that match corresponding screwing threads at the distal end of the converter ring 402b. It should be understood that, in some embodiments, that the protruding portion of the light diffuser may extend into the opening of the ring flash to connect to the converter ring 402b. When the light diffuser is screwed on to the ring flash, the protruding portion 470 of the light diffuser 410 extends into an interior opening of the ring flash 408 while the body of the light diffuser 410 covers the light emitting area 428 of the ring flash 408. Accordingly, when the light diffuser 410 is attached to the ring flash 408, light that is emitted from the ring flash 408 passes into a cavity formed by the body of the light diffuser 410 and is diffused by passing through the body of the light diffuser 410 resulting in the desired lighting effect.

Figure 5A:
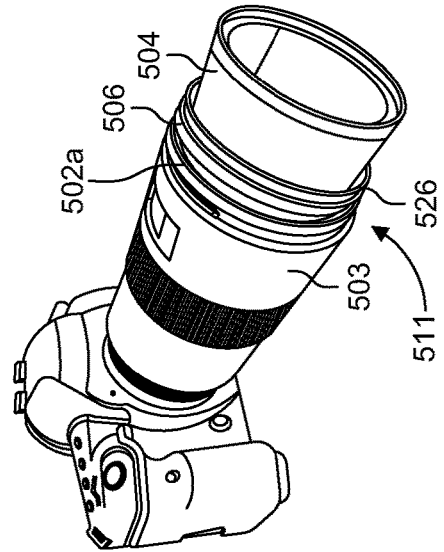
FIG. 5A is a perspective view of a camera with a mounted lens, in accordance with an embodiment of the present invention.
Figure 5B:
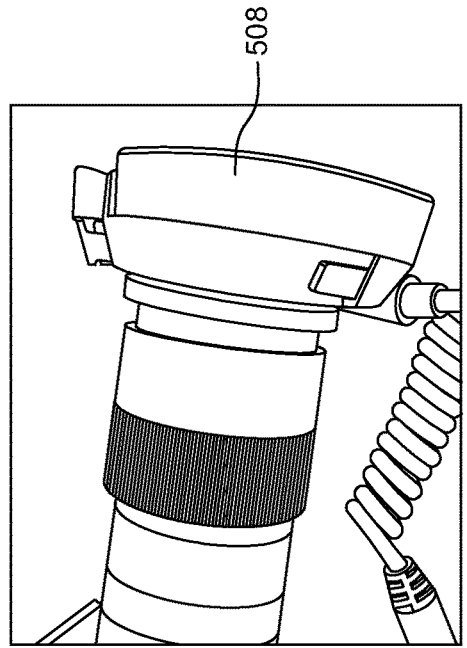
FIG. 5B is a perspective view of a camera with a mounted diffuser adapter, in accordance with an embodiment of the present invention.

Another embodiment of an assembly of a ring flash light diffusion device 500 is shown in FIGS. 5A-5G. As can be seen in FIG. 5A, a first converter ring 502a is configured to connect to a camera lens 503. It should be understood that the first converter ring can have a one screwing attachment means of first diameter at a distal end and another screwing attachment means of a second diameter at a proximal end, and wherein the distal diameter is larger than the proximal diameter. FIG. 5B depicts a diffuser adapter 504 connected to a first end of the first converter ring 502a and a flash ring 506 connected to the diffuser adapter 504 at a position 511 along the length of the diffuser adapter 504. In some embodiments, the diffuser adapter 504 is connected to the first end of the first converter ring 502a by corresponding screwing attachment means. In a preferred embodiment, the diffuser adapter 504 includes a screwing attachment means along a circumference of the diffuser adapter positioned between a first end and a second end of the diffuser adapter configured to attach to the flash ring 506.

Figure 5C:
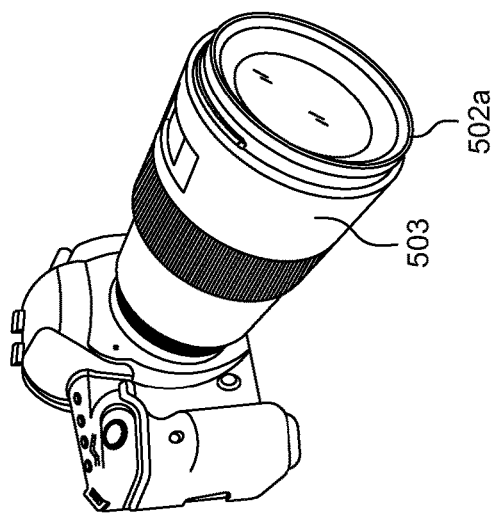
FIG. 5C is a side view of a camera with a mounted diffuser adapter and detached ring flash, in accordance with an embodiment of the present invention.
Figure 5D:
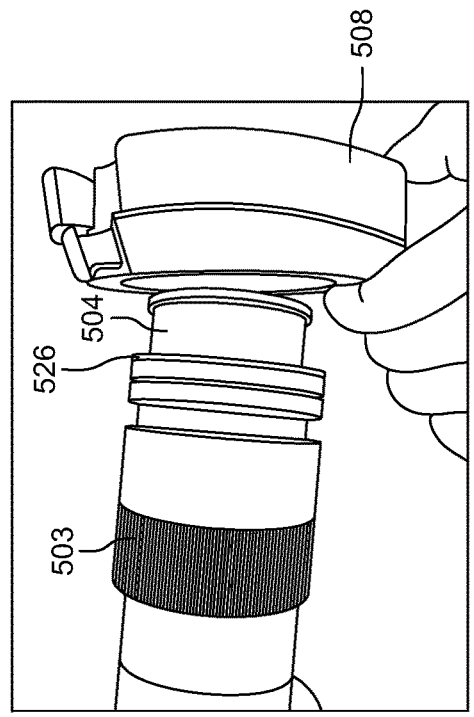
FIG. 5D is a side view of a camera with a mounted ring flash surrounding the diffuser adapter, in accordance with an embodiment of the present invention.
Figure 5E:
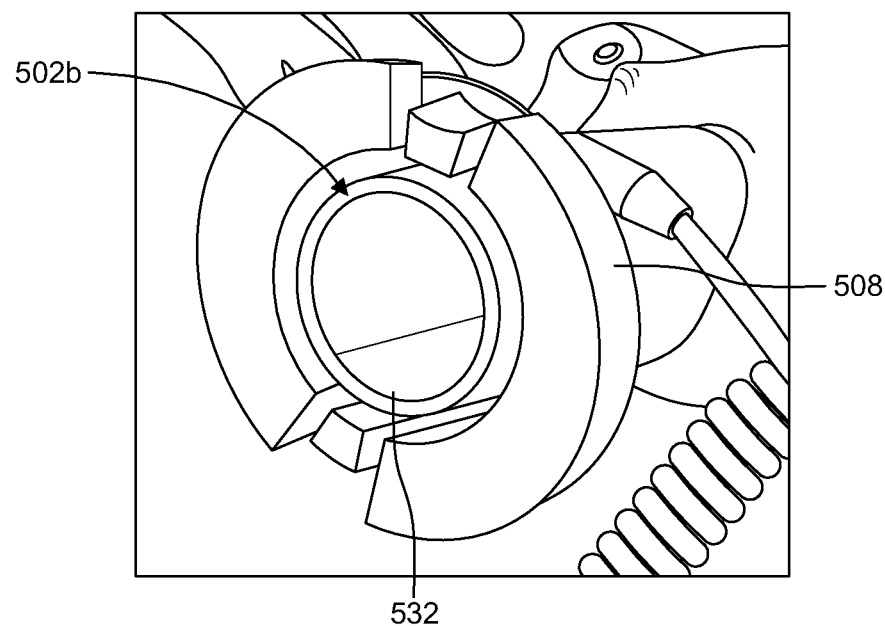
FIG. 5E is a front perspective view of a camera with a mounted ring flash surrounding the diffuser adapter, in accordance with an embodiment of the present invention.
Figure 5F:
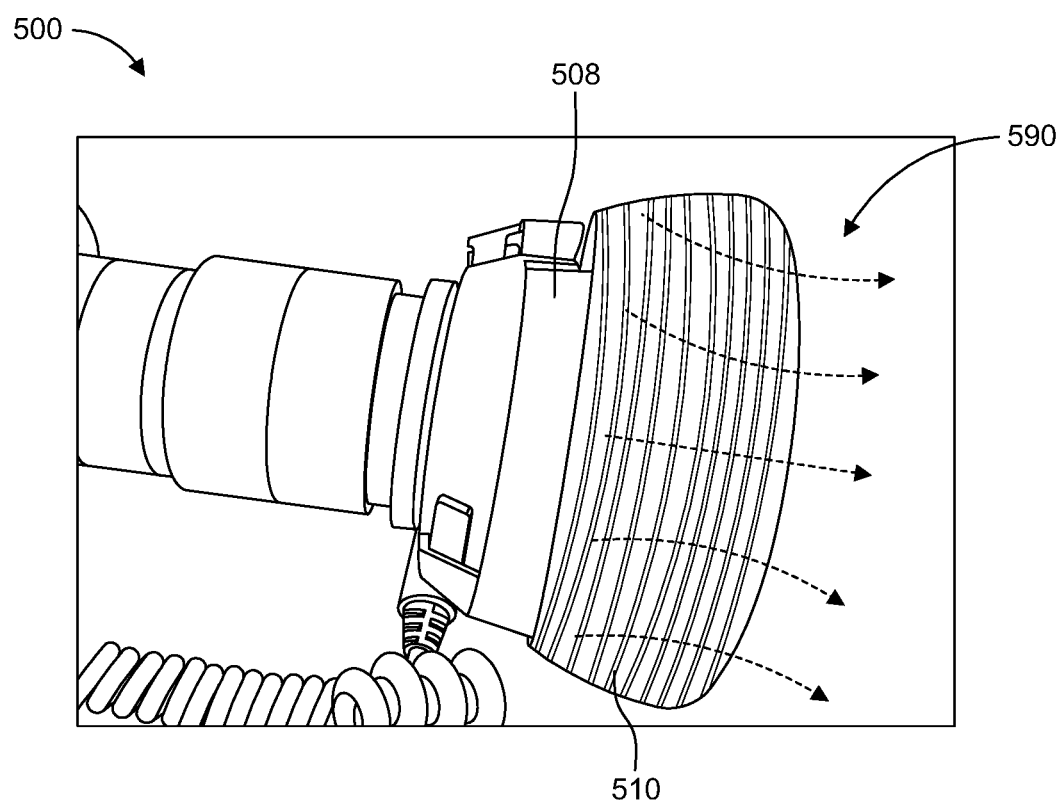
FIG. 5F is a side view of a lens with a mounted ring flash and light diffuser, in accordance with an embodiment of the present invention.
Figure 5G:
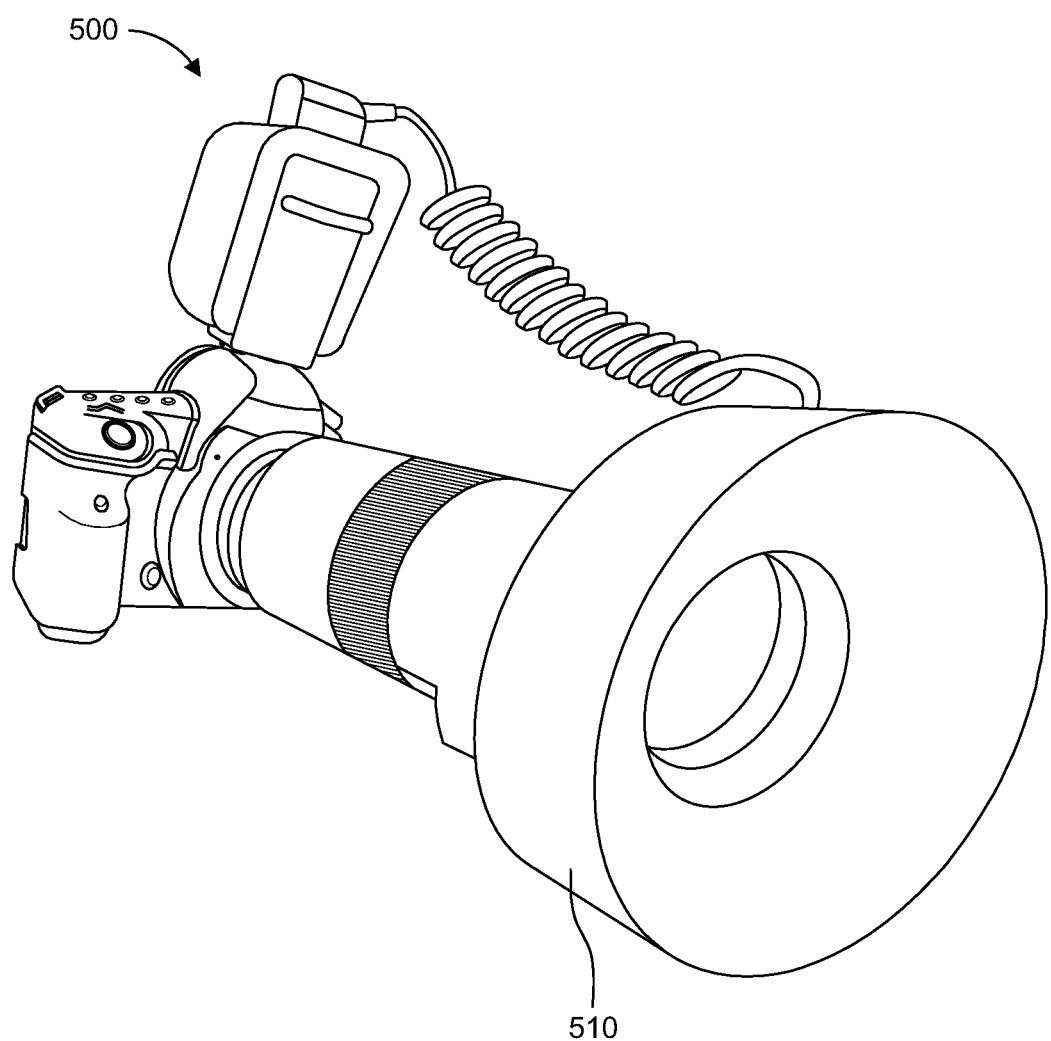
FIG. 5G is a perspective view of a camera with a lens, a mounted ring flash, and light diffuser, in accordance with an embodiment of the present invention.

FIG. 5C shows the ring flash detached from the flash ring 506 and FIG. 5D shows the ring flash connected to the flash ring. In some embodiments, the flash ring 506 has a circumferential groove 526 on an exterior surface configured to secure the ring flash 508 to the flash ring 506 In some embodiments, a second converter ring 502b connects the light diffuser to the diffuser adapter. The attachment means 532 at a distal end of converter ring 502b, visible as attached to a portion of the diffusor adapter 504 extending through the opening of the ring flash 508, remain accessible for attachment to corresponding attachment means of the light diffuser 510. FIGS. 5F-5G depict the light diffuser 510 connected to the diffuser adapter 504. In one embodiment, wherein light diffuser 510 has a body that forms a concave cavity defined by an inner cylindrical wall and an outer wall. The light diffuser 510 is positioned over the ring flash 508 such that light 590 emitted from the ring flash 508 passes through the light diffuser.

Figure 6B:
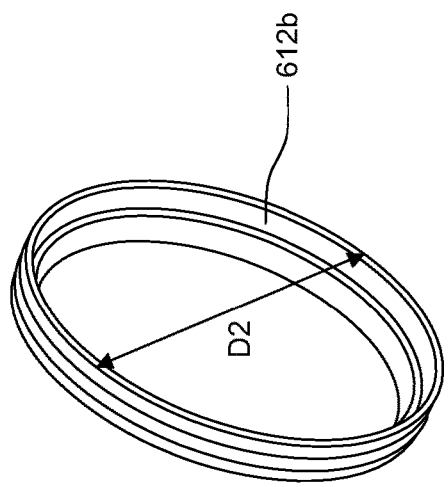
FIG. 6B is a front perspective view of a converter ring, in accordance with an embodiment of the present invention.
Figure 6C:
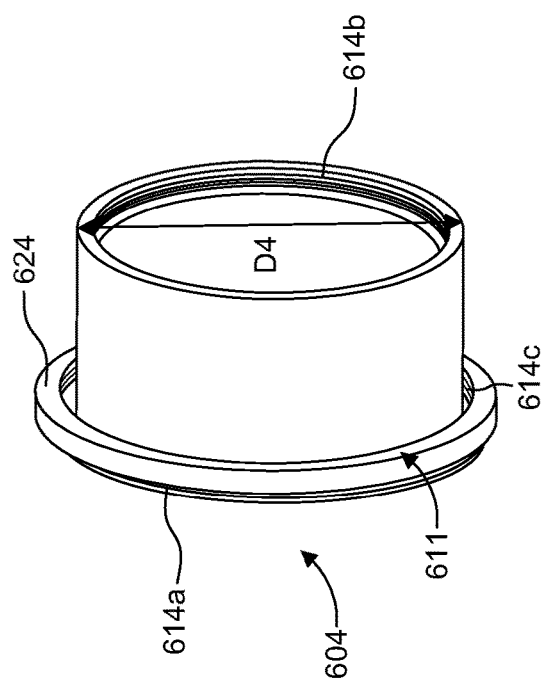
FIG. 6C is a perspective view of a diffuser adapter, in accordance with an embodiment of the present invention.
Figure 6A:
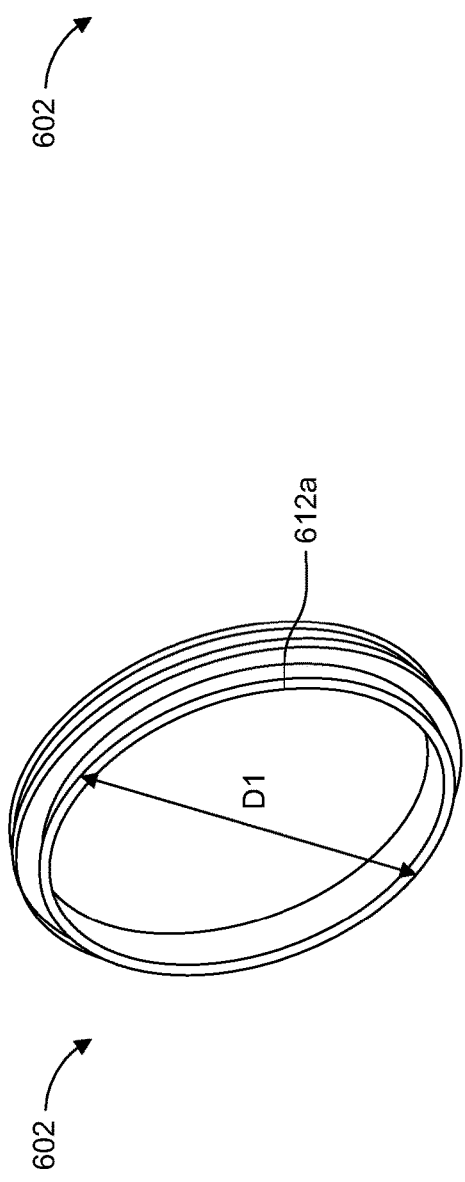
FIG. 6A is a rear perspective view of a converter ring, in accordance with an embodiment of the present invention.
Figure 6D:
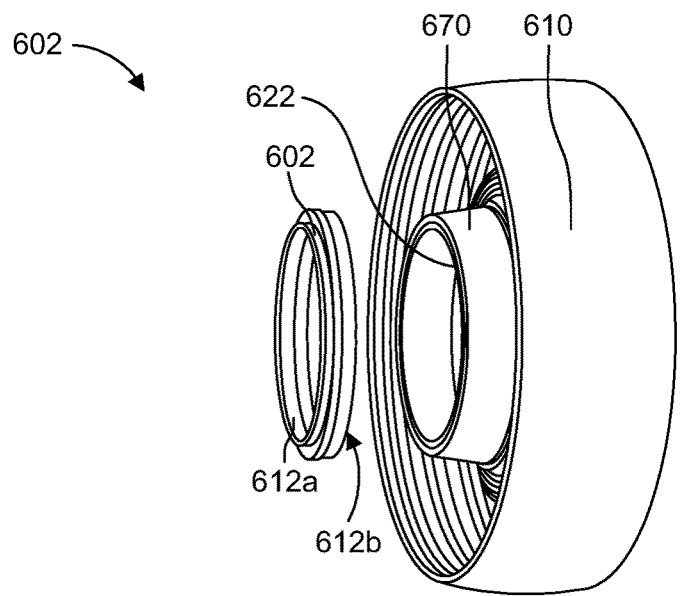
FIG. 6D is a perspective view of a detached converter ring and a light diffuser, in accordance with an embodiment of the present invention.

Turning now to FIGS. 6A-6E, a converter ring 602, diffuser adapter 604, and diffuser 610 can be seen in greater detail. As shown in FIGS. 6A-6B, a converter ring 602 can have a smaller diameter $D_1$ at one end and a larger diameter D2 at the other end. Furthermore, the converter ring 602 can have screwing threads 612a, 612b or grooves located on an outer circumferential surface or an inner circumferential surface at either end. For example, there can be screwing threads at an outer circumference (i.e., male threads 612a) at a proximal end of the converter ring as well as at an inner circumference (i.e., female threads 612b) at a distal end of the converter ring. Alternatively, in some embodiments, there can be screwing threads at an inner circumference at a proximal end of the converter ring as well as at an outer circumference at a distal end of the converter ring. As shown in FIG. 6D, the converter ring 602 can be configured to attach to corresponding threads 622 at a connection with a protruding circular portion 670 of the light diffuser 610. In a preferred embodiment, a converter ring 602 has a 62 mm screwing attachment means on one end and a 67 mm screwing attachment means on an opposite end (i.e., the second converter ring can be a 62-to-67 mm converter ring). In another embodiment, a ring 602 with screwing attachment means on one side is molded into or glued into groove 622 of diffuser 610.

Figure 6E:
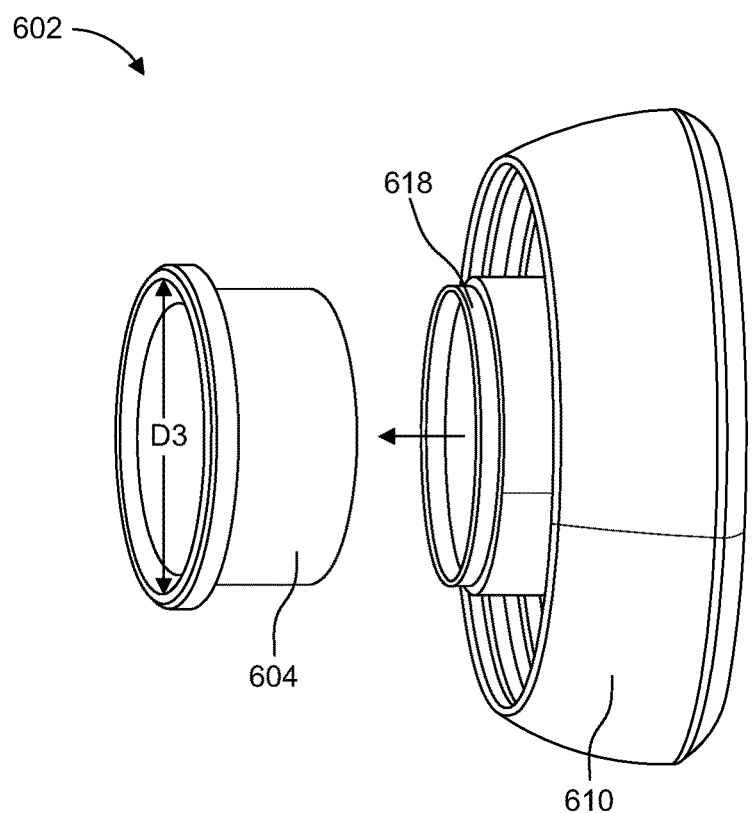
FIG. 6E is a perspective view of a detached diffuser adapter and light diffuser with mounted converter ring, in accordance with an embodiment of the present invention.

As can be seen in FIGS. 6C and 6E, the diffuser adapter 604 can have male threads 614a along a circumference at a proximal end and female threads 614b at a distal end thereof (e.g., position 612). Furthermore, the diffuser adapter 604 can have different outer and inner circumferences at opposite ends. For example, the outer circumference $D_3$ at the proximal end of the diffuser adapter 604 may be larger than the outer circumference $D_4$ at the distal end to permit the distal end to fit through the opening of a converter ring 602 or of a ring flash. Moreover, the diffusion adapter 604 can have female screw thread or male screw thread attachment means 614c along a circumferential lip 624 at position 611. It should be understood that the lip 624 can be located at various distances from each of the proximal and distal ends of the diffuser adapter 604.

In some embodiments, as shown in FIG. 6D, the converter ring 602 and the light diffuser 610 can be connected by screwing attachment means 612b and 622. In other embodiments attachment means 612b are connected to groove-like attachment means 622 by gluing or heated molding. In one embodiment, threads 612b present on a distal end of the converter ring 602 can be attached to corresponding threads 622 within a channel formed on a proximal end of a protruding portion 670 of the light diffuser 610. In an alternative embodiment, attachment means 612b are inserted into groove-like attachment means 622 and secured in place by gluing or heated molding. As can be seen in FIG. 6E, the light diffuser 610 can be connected to the diffuser adapter 604 through one or more intervening converter rings 602 in some embodiments, while in other embodiments the light diffuser 610 can be directly connected to the threads 614b at a distal portion of the diffuser adapter 604 by corresponding circumferential threads 618 at a proximal end of the light diffuser.

Figure 7A:
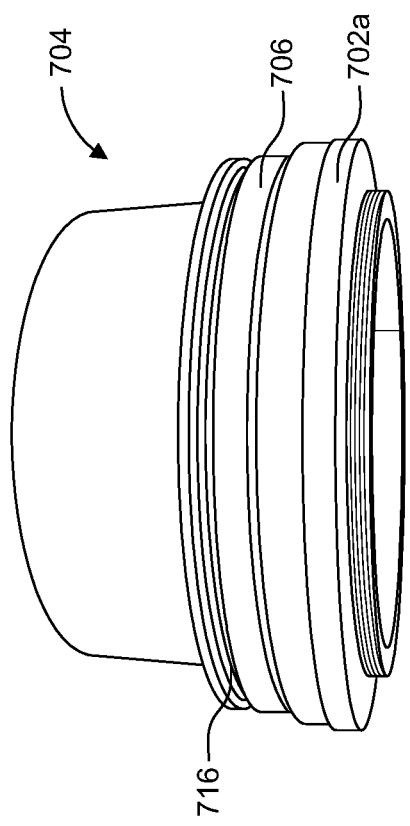
FIG. 7A is a top view of a diffuser adapter with a mounted first converter ring, in accordance with an embodiment of the present invention.
Figure 7B:
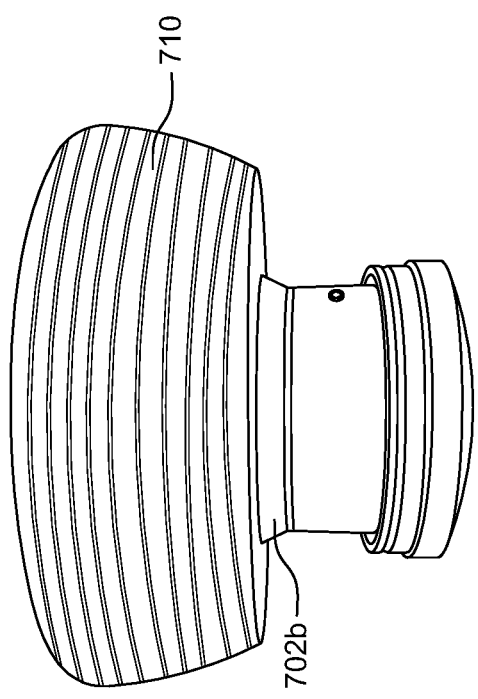
FIG. 7B is a top view of a diffuser adapter with a mounted first converter ring and ring flash adapter, in accordance with an embodiment of the present invention.

Turning now to FIGS. 7A-7D, a set of more detailed views of the assembly of a ring flash light diffusion device in accordance with an embodiment of the present invention is shown. As can be seen in FIG. 7A, when a converter ring 702a is connected to the diffuser adapter 704, attachment means along the circumference of lip 724 remain accessible for connection with the flash ring 706 at position 711. Further, FIG. 7B depicts the flash ring 706 attached to the diffuser adapter 704. By reference to FIG. 7A-7B it can be seen that the distal portion 781 of the body of the diffuser adapter 704 (relative to the lip 724) extends through and beyond the flash ring 706. The flash ring includes a circumferential groove 716 to which depressable or latching attachment means of a ring flash (not shown) may be circumferentially connected. It should be understood that a ring flash, not shown in FIGS. 7A-7D, can be attached on to the flash ring 706 by attachment means located on an inner circumference of the flash ring that correspond to attachment means (e.g., groove 716) on the flash ring.

Figure 7C:
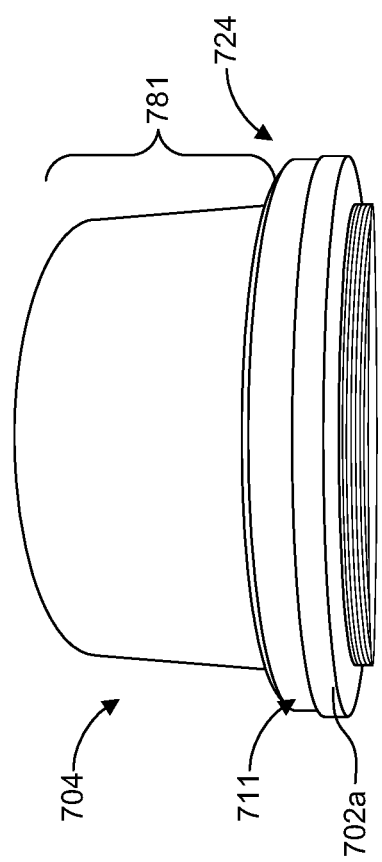
FIG. 7C is a top view of a diffuser adapter with a mounted converter ring, ring flash adapter, and second converter ring, in accordance with an embodiment of the present invention.
Figure 7D:
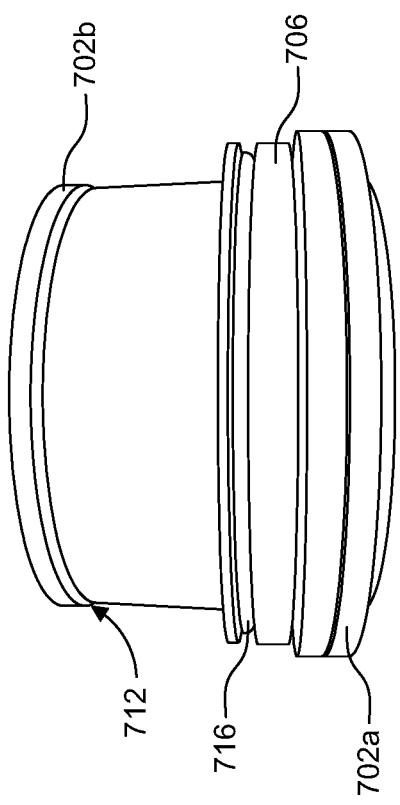
FIG. 7D is a top view of a diffuser adapter with a mounted converter ring, ring flash adapter, second converter ring, and light diffuser, in accordance with an embodiment of the present invention.

As shown in FIG. 7C, in some embodiments, another converter ring 702b can be connected by attachment means (e.g., corresponding threads) at a distal end of the diffuser adapter (e.g., position 712). As further shown in FIG. 7D, a light diffuser 710 can be connected to the converter ring 702b by corresponding thread attachment means. In embodiments where the light diffuser 710 is directly connected to the diffuser adapter 704 at a proximal end of the light diffuser, the light diffuser may have an integral metal ring portion at its proximal end with threads corresponding to the attachment threads of the distal end of the diffuser adapter. In the various attachment junctions between the converter rings, flash ring, diffuser adapter, and light diffuser, one skilled in the art would understand that the diameters and threads of the connecting elements should correspond respectively to each other in order to form a secure attachment. It should be understood that a ring flash would be located between positions 711 and 712 but is omitted in the depiction so as not to obscure the other components. In this manner, the positioning of the light diffuser 710 relative to the ring flash would cause the light emitted from the ring flash to pass through the body of the light diffuser and produce the desired diffusing and softening effect.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

What is claimed is:

1. A ring flash light diffusion device comprising:
   a body formed with a semitransparent material, the body including:
      a first circular wall;
      a second circular wall, comprising the semitransparent material, concentric with the first circular wall and surrounding the first wall;
      a ring of the semitransparent material connecting the first circular wall and the second circular wall, wherein the first circular wall defines an opening extending through the body; and
      an attachment means at an end of the first circular wall that is opposite the ring; and
   wherein the body forms a concave cavity defined by the first circular wall, the second circular wall, and the ring such that light emitted from a light emitting portion of a ring flash positioned at the end of the first circular wall passes through the cavity and the body of the ring flash light diffusion device.

2. The ring flash light diffusion device of claim 1, wherein an inner surface or an outer surface of the body is textured.

3. The ring flash light diffusion device of claim 1, wherein the second wall is angled at an acute angle relative to a rotational axis of symmetry of the opening such that the body is tapered in a direction going from a distal end to a proximal end relative to the attachment means.

4. The ring flash light diffusion device of claim 1, wherein the ring is perpendicular relative to its axis of rotation.

5. The ring flash light diffusion device of claim 1, wherein the ring is angled relative to at least one of the first wall and the second wall.

6. The ring flash light diffusion device of claim 1, wherein the attachment means at an end of the first circular wall comprise a screwing attachment means, located at a circular protruding portion of the body, configured to engage corresponding attachment means along a circumference of the ring flash.

7. The ring flash light diffusion device of claim 1, wherein the body at least partially covers the light emitting portion of a circular ring flash when the body is connected to the circular ring flash.

8. The ring flash light diffusion device of claim 1, wherein the first circular wall and the second circular wall define the cavity configured to cover the light emitting portion of the ring flash such that light emitted from the ring flash passes through the ring of the body of the ring flash light diffusion device after passing through the cavity.

9. The ring flash light diffusion device of claim 1, wherein the first circular wall is formed of a different material than the second circular wall.

10. The ring flash light diffusion device of claim 1, wherein an inner surface and an outer surface of the body are either both textured or both substantially smooth.

11. The ring flash light diffusion device of claim 1, wherein the body comprises a polymer material.

12. The ring flash light diffusion device of claim 1, wherein the first wall has a diameter within a range of 50 millimeters to 80 millimeters.

13. The ring flash light diffusion device of claim 1, wherein the second wall is parallel to the first wall.

14. The ring flash light diffusion device of claim 1, wherein the ring is perpendicular to its axis of rotation.

15. The ring flash light diffusion device of claim 2, wherein a textured surface comprises at least one of ridges, bumps, grooves, zig-zags, and a combination thereof.

* * * * *